Nov. 14, 1933. F. J. HOLMES Re. 18,994

ROTARY VALVE

Original Filed June 7, 1928 4 Sheets-Sheet 1

Frederick J. Holmes
Inventor
By C. A. Snow & Co.
Attorneys

Nov. 14, 1933. F. J. HOLMES Re. 18,994

ROTARY VALVE

Original Filed June 7, 1928 4 Sheets-Sheet 2

Frederick J. Holmes
Inventor

By C. A. Snow & Co.
Attorneys

Nov. 14, 1933. F. J. HOLMES Re. 18,994

ROTARY VALVE

Original Filed June 7, 1928 4 Sheets-Sheet 3

Frederick J. Holmes

Inventor

By C. A. Snow & Co.

Attorneys

Nov. 14, 1933. F. J. HOLMES Re. 18,994

ROTARY VALVE

Original Filed June 7, 1928 4 Sheets-Sheet 4

Frederick J. Holmes

Inventor

By C. A. Snow & Co.

Attorneys

Reissued Nov. 14, 1933

Re. 18,994

UNITED STATES PATENT OFFICE 18,994

ROTARY VALVE

Frederick J. Holmes, Detroit, Mich., assignor, by mesne assignments, to Rotary Holding Company, Detroit, Mich., a corporation of Michigan Original No. 1,754,019, dated April 8, 1930, Serial No. 283,619, June 7, 1928. Application for reissue June 29, 1932. Serial No. 621,127

22 Claims. (Cl. 123—190)

This invention relates to rotary valves for machines such as internal combustion engines, compressors or the like which include a working piston and cylinder to which fluid is admitted and exhausted through a port and has for its principal object to provide a new and improved construction for such valves that will be highly efficient and successful in practical, commercial operation and whereby the use of poppet valves for such machines, with all of the disadvantages inherent thereto, may be obviated and a valve structure employed that will increase the efficiency and flexibility of performance of such machines towards which desired results so much costly engineering effort, design and experimentation is at present being directed.

Another object is to provide sealing means intermediate the rotary valve and the cylinder port through which the gases are admitted and exhausted, which sealing means will effectively prevent leakage of gases past the working surfaces of the rotary valve and will obviate loss of compression.

A further object is to so construct said sealing means that a restricted circuitous path around its contacting or bearing surfaces is provided and also preferably to include in such passage a sump or chamber for containing a lubricant or other liquid which will furnish a liquid seal to prevent gas leakage.

Another object is to provide a rotary valve particularly designed for use with an internal combustion engine and which valve includes a chamber of relatively large volume for the incoming fuel gases or mixture immediately adjacent to the engine cylinder and to provide an inlet valve opening of much greater area than heretofore obtained so that a marked increase of volumetric efficiency is secured.

Still another object is to construct a rotary valve for an internal combustion engine whereby an engine designed primarily for operation with gasoline as fuel may be operated with equal or even greater efficiency with less volatile and relatively cheaper fuels such as fuel oil of from 28 to 32° Baumé.

A further object is to provide a practical rotary valve that is particularly adapted for use with an internal combustion engine and of the type wherein the incoming gases are admitted through a conduit or chamber incorporated in the valve adjacent to a conduit or chamber through which the outgoing exhaust gases are passed and to so construct the valve and associated parts that it will operate successfully and practically at the high temperatures encountered in internal combustion engines.

Another object is to provide a practical commercially operative valve construction especially adapted for internal combustion engines that will posses all of the advantages of overhead feeding of the fuel without the disadvantages inherent in the use of the poppet valves at present universally employed, among which disadvantages may be noted the scoring of the valve seating surfaces due to wire drawing of the gases caused by the necessity of passing the gases at high velocity through restricted orifices, the necessity of overcoming the inertia of a large number of reciprocating parts, the burning and carbonizing of the valve seating surfaces and the excessive wear on the parts, and to provide a construction in which the advantages of rotary motion over reciprocating motion are secured with the added advantages of the elimination of a large number of parts heretofore necessary with poppet valves, the obtaining of a valve opening of much larger cross sectional area than possible with poppet valves and the securing of a full valve opening in but a small fractional part of the angular motion of the engine's crank shaft that is required to secure full opening of a poppet valve and to secure a better cooling of the valve and associated parts than is possible with poppet valves as well as a better compensation for rapid and marked variation in temperature.

A further object is to provide a construction of a cylinder head and rotary valve casing including a practical, operative rotary valve that may be made and sold as an attachment capable of being substituted for the valve head of a standard commercial internal combustion engine.

Another object is to improve upon rotary valves of the type to which the present invention relates by providing inlet and exhaust ports at the periphery of the valve of relatively large arcuate dimensions thereby to secure free flow of the gases to and from the cylinder and a full valve opening of much longer duration than secured with prior constructions.

With these and other objects in view, my invention consists of the novel construction, combination and arrangement of the parts hereinafter fully described and claimed and illustrated in the accompanying drawings in which:

Figure 1:
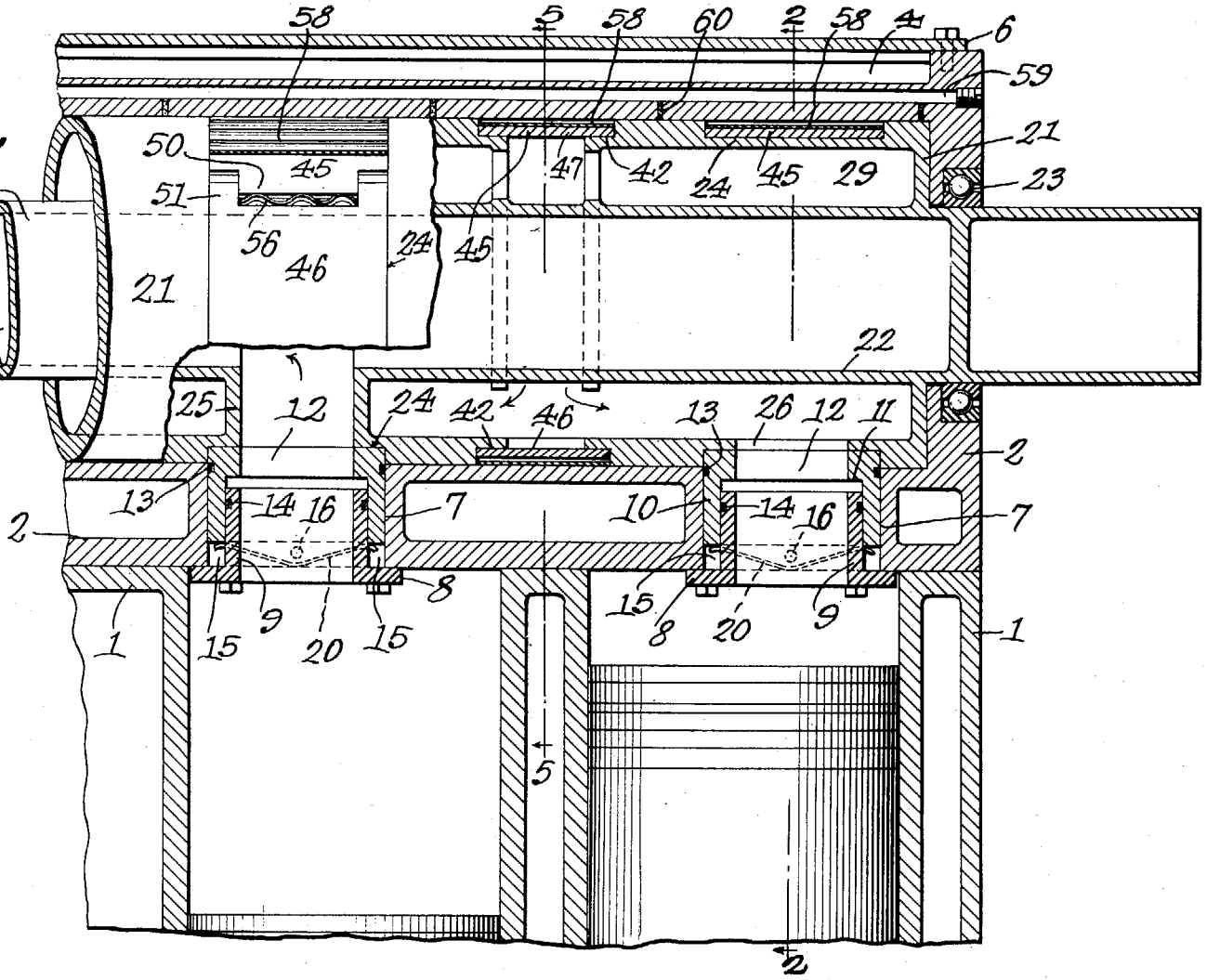
Fig. 1 is a longitudinal section through a portion of the head of the engine, portions of cylinders cooperating therewith being also shown in section and a valve in the head being shown partly in section and partly in elevation.

As shown in the drawings the reference character 1 indicates the cylinder block of an internal combustion engine which, as shown in Fig. 1, includes a plurality of workng cylinders each having a piston mounted for reciprocation therein. Suitably secured to the block 1 is a combined cylinder head and valve casing 2, which, as shown, includes a cylindrical valve chamber 3 preferably surrounded by a water jacket 4 to which access may be had through an opening 5 normally closed by a removable closure plate 6. The head 2 is provided with a plurality of ports 7, one for each cylinder of the cylinder block. Each port 7 is located above its respective cylinder and in communication therewith and also communicates with the cylindrical valve casing 3. Admission and exhaust of gas through said port 7 to and from its respective cylinder is under the control of the rotary valve presently to be more fully described, mounted within the valve chamber 3.

Figure 7:
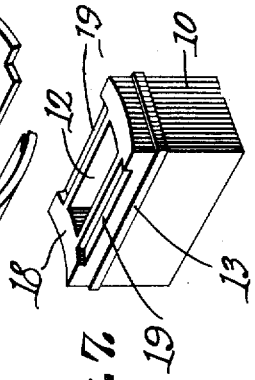
Fig. 7 is a perspective view of one of the port takeups or sealing blocks.
Figure 8:
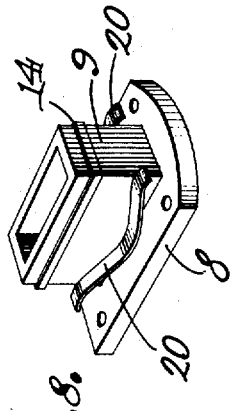
Fig. 8 is a perspective view of the support and guide for the block shown in Fig. 7.

In order to insure effective sealing of the rotary valve, adjacent to each port 7, and to prevent leakage of gas past the valve contact surfaces from exhaust to inlet or vice versa, sealing means are provided at the mouth of each port. Such sealing means preferably consists of means rigidly secured to the valve casing and forming therewith an annular recess and a member having a bearing surface for contact with the periphery of the rotary valve and a sleeve portion which extends into said recess and in contacting sealing engagement with the side walls thereof. In the particular constructional example illustrated the means which is fixed to the valve head for defining the annular recess referred to comprises a lower member having a laterally extending flange 8 which is suitably secured to the head 2 at the lower end of the port 7 and which has a sleeve portion 9 located in spaced relationship to the side walls of the port 7 and defining with said side walls an annular recess. Mounted for reciprocation within such recess and in neat sliding engagement with the outer periphery of the sleeve 9 and the walls of the port 7 is a sleeve-like extension 10 of a sealing member having at the upper end thereof an enlarged head 11 adapted to contact in sealing engagement with the periphery of the rotary valve 21. The head 11 is in overlapping arrangement with the upper end of the sleeve 9 and is provided with a bore 12 of the same size and dimension as the bore of the sleeve 9. It will be noted that the bearing surface between the sealing members 9 and 10 form in effect a circuitous restricted path through which any gas would be compelled to pass in order to leak past the contacting bearing surface of said sealing members. For the purpose of insuring more effective sealing of such members a sealing ring 13 may be located between the upper end of the sealing member 10 and the side walls of the port 7 and a similar sealing ring 14 may be provided between the upper end of the sleeve portion 9 of the lower sealing member and the sleeve portion 10 of the upper sealing member. It will be noted that the sleeve portion 10 of the upper sealing member does not contact with the flange 8 of the lower member, but that a space 15 is left between said flange and the lower end of the member 10, this space providing a sealing chamber or sump in which any suitable liquid, such as oil, may be received to form a liquid seal intermediate the ends of the circuitous pathway above described. As shown, oil from the lubricating system of the engine is preferably supplied to the sump or chamber 15 through a bore 16 to which is connected a feed pipe 17 which leads to the oil pump, not shown, of the engine. The enlarged head 11 of the upper sealing member is provided with a concave bearing surface 18, as shown most clearly in Fig. 7 of the drawings, for contacting sealing engagement with the periphery of the rotary valve 21. Recesses or grooves 19 are provided in the sealing member 10 at the side edges of the concaved bearing surface 18 for a purpose presently to appear. In order to hold the concave bearing surface 18 in sealing engagement with the periphery of the valve 21, springs 20 are preferably located within the sump 15 and abut against the lower end of the member 10 and the flange of the member 8 and normally serve to urge the member 10 upwardly. It will be noted that these springs are submerged within the oil contained in the sump 15 and will be kept cool by the circulation of oil through such sump.

Figure 2:
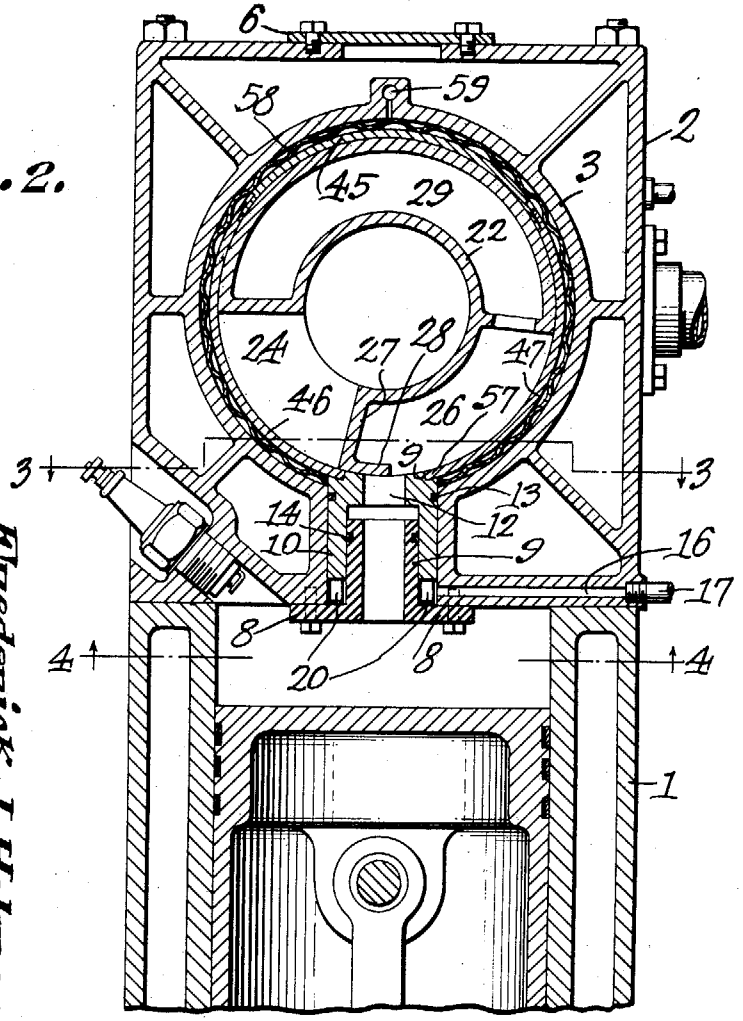
Fig. 2 is a section on line 2—2, of Fig. 1.

Mounted for rotation within the housing 3 in head 2 is a cylindrical rotary valve 21 having a concentric tubular core 22 constituting the exhaust manifold of the engine. This core or exhaust manifold is spaced from the peripheral portions of the rotary valve and, as shown at the right of Fig. 1, can be extended beyond the head 2 where a suitable bearing 23 can be employed for facilitating rotation of the valve. A plurality of annular grooves 24 are formed in the outer surface of the valve in alignment with each of the ports 7 and the concave face 18 of each of the takeup members 10 is adapted to bear against the valve within its respective one of these grooves 24, the said takeup member being of a length substantially equal to the width of the groove in which it is seated. Extending to the exhaust manifold 22 from each of the grooves 24 is an exhaust port 25 and formed in the valve at proper points are intake ports 26 adapted to register with the openings 12 at the proper times during the cycle of operation of the engine. As shown particularly in Fig. 2 the exhaust port 25 extends through slightly less than ninety degrees. The intake port associated with said exhaust port 25 and indicated at 26 extends through substantially ninety degrees but the advancing wall of this port, indicated at 27, has a cut-off flange 28 extending therefrom for the purpose of maintaining the opening 12 completely closed until the exhaust port 25 has passed out of communication with said opening. The remaining space within the valve outside of the exhaust manifold 22 and between exhaust port 26 and the exhaust port 25 provides an intake manifold 29 into which fuel will be directed from the supply port of the engine.

Figure 5:
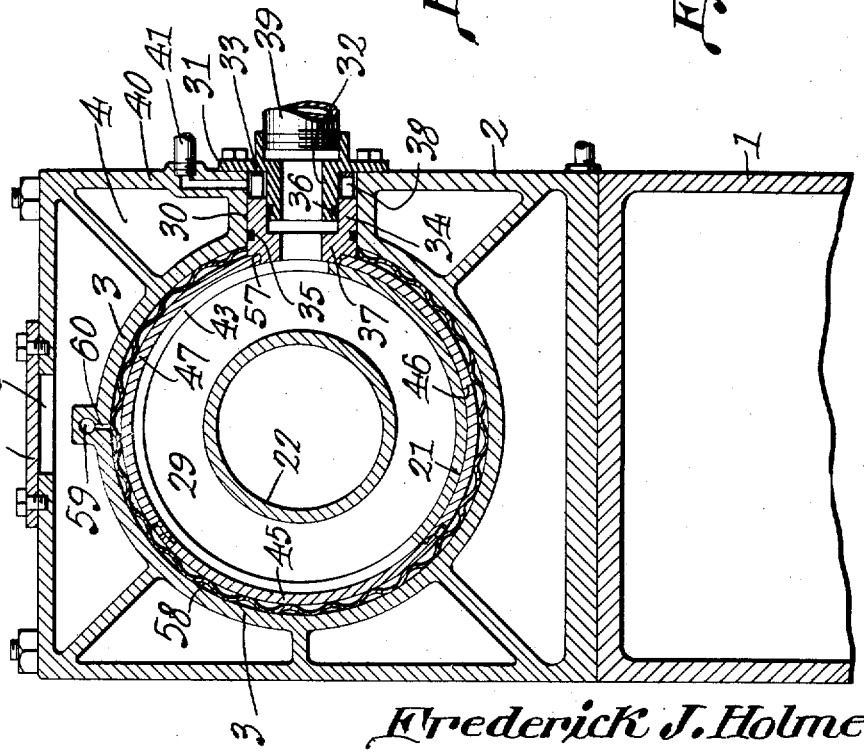
Fig. 5 is a section on line 5—5, Fig. 1.

The ports 25 and 26 are arranged preferably in pairs, one port 25 and one port 26 being provided for each of the ports 7 and the same being so located as to operate in properly timed relation. Arranged between these pairs of ports is a fuel supply port 30 shown particularly in Fig. 5. Located at the outer end of this port 30 is a combined sealing and pipe connecting means comprising an annular flange 31 carried by a guide sleeve 32 similar to the sleeve 9 and providing an oil pocket 33 around the sleeve and within the port 30. A takeup block 34 similar to the block 10 extends around the sleeve 32 and within port 30 and is provided with a seal ring 35. A seal ring 36 is also carried by the sleeve 32. The head portion 37 of the takeup block is similar to the head portion of the block 10 already explained and is adapted to be held against the periphery of the rotary valve 21 by springs 38 seated in the oil pocket. A fuel supply pipe 39 opens into the sleeve 32 and as the oil pocket 33 is in communication through a bore 40 with a pipe 41 of the pressure lubricating system, it will be apparent that the springs will be constantly submerged and thus protected from injury by heat. The head of the block 34 engages within an annular groove 42 formed in the outer periphery of the valve 21 between the grooves 24 and, as shown particularly in Fig. 5, a port 43 is formed in the valve 21 and extends through approximately two hundred seventy degrees so as to insure a sufficient supply of fuel to the intake manifold 29.

Figure 6:
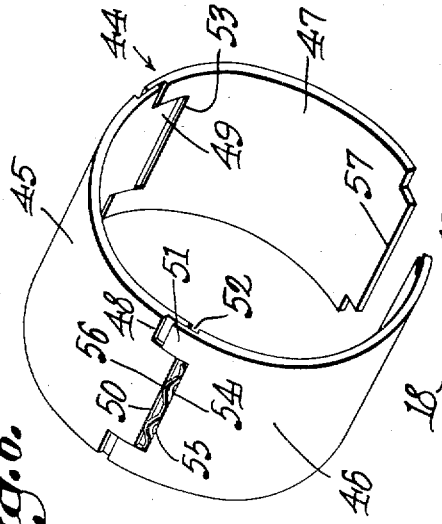
Fig. 6 is a perspective view of one of the sealing sleeves of the valve.

For the purpose of maintaining a sealed connection between the rotary valve and its casing irrespective of any contraction or expansion of the parts that might take place, there is provided within each of the grooves 24 and 42 a sealing sleeve 44 shown in detail in Fig. 6. This sleeve is preferably formed of three arcuate resilient plates 45, 46 and 47. Plate 45 is provided at the sides of each end with recesses 48 in the outer surface thereof and extending from the ends of the plate between these recesses are tongues 49 the outer faces of which are cut away as shown at 50. Cooperating with each end of the plate 45 are the adjacent ends of the plates 46 and 47. Each of these plates has tongues 51 extending from the sides thereof at its end, the tongues being cut away at their inner sides as shown at 52 so as thus to form a sliding lapping contact with the plate 45 within the recesses 48. The ends of the plates 46 and 47 nearest plate 45 have their inner faces cut away between the tongues 51 as shown at 53 to receive the tongues 49 which thus have a sliding lapping contact. As the tongues 49 have their outer faces cut away, transverse shoulders 54 are produced between the base portions of the tongues 51. These shoulders 54 cooperate with the shoulders 50 to form pockets 55 in which springs 56 are seated. These springs are adapted normally to hold the plates 46 and 47 pressed away from the plate 45 without, however, breaking the lapping contact between the cooperating portions of the plates.

Figure 3:
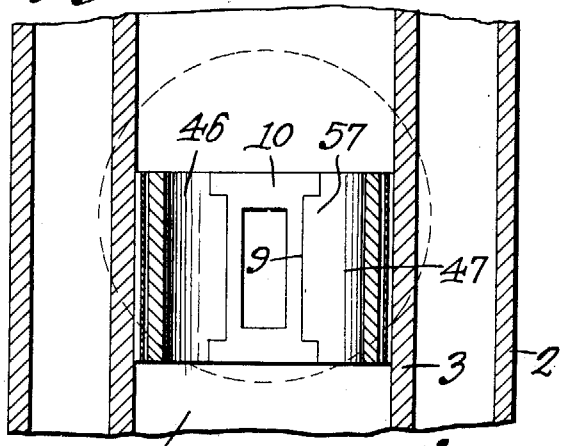
Fig. 3 is a section on line 3—3, Fig. 2.
Figure 4:
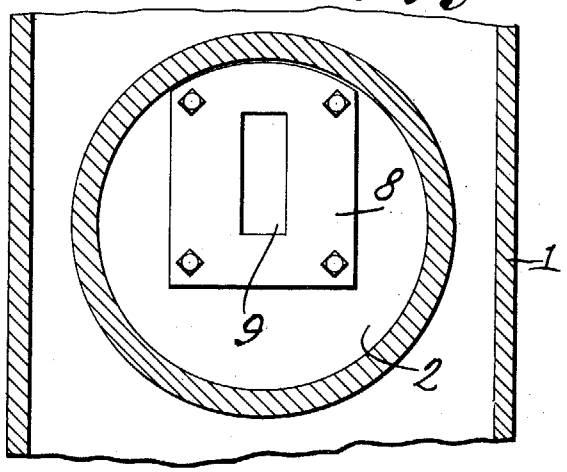
Fig. 4 is a section on line 4—4, Fig. 2.

Those ends of the plates 46 and 47 remote from the plate 45 are formed with transverse tongues 57 terminating inwardly from the opposed edges of the plates as shown particularly in Fig. 6. These tongues are adapted to fit snugly within the grooves 19 in the adjacent takeup member or block 10 as is illustrated more especially in Fig. 3.

It is to be understood that the band or sleeve 44 is proportioned to fit snugly against the periphery of the valve within that groove 24 in which the band or sleeve is mounted. For the purpose of holding said band or sleeve spaced from the inner surface of the valve casing or housing 3 is a spring 58 in the form of a transversely corrugated strip seated within the groove and outside of the sealing band or sleeve, the ends of this spring terminating at opposite sides of the adjacent takeup member 10 or 34. These springs tend constantly to contract the sealing band 44 about the sleeve so as to provide a tight connection which will compensate for wear and any irregularities of contour. As before explained one of the sealing bands or sleeves 44 is located within each of the grooves in the valve and one of the springs 58 is located around each of these bands or sleeves. Lubricant is supplied to the spaces occupied by the springs 58 from a bore 59 communicating with the force feed lubricating system, this bore having outlets 60 opening into the several spaces occupied by the springs 58.

As before explained the springs 20 and 38 are constantly submerged in oil. These springs serve to hold their respective takeup blocks pressed against the periphery of the valve so as to provide a tight connection through which pressure cannot leak. As oil under pressure is located back of the respective takeup blocks or sealing members, this oil will act to press against said members and force them firmly against the valve. The springs are merely employed for holding the members in active position. The oil acts to provide the necessary liquid seal to prevent gas leakage. The oil also serves to prevent the springs from being burned or otherwise injured from excessive heat in the engine. The sealing bands or sleeves provide tight connections between the valve and the ends of the takeup members 10 and 34 and also constitute contractible inner casings for the valve so as to prevent leakage of pressure along the valve in any direction. As the valve is rotated in properly timed relation to the reciprocation or cycle of operation of the pistons of the engine by any suitable means not shown the port 26 will be brought into communication with the openings 12 in the members 10, thereby to supply fuel to the cylinders during the intake stroke. Likewise, at the proper time during the cycle of operation, the exhaust port 25 will be brought into communication with the opening 12 in the adjacent takeup member 10. The gases will be exhausted into the manifold 22 and the heat therefrom will serve to heat and bring to a highly vaporized condition the gas in the intake manifold 29. This vaporized gas will prevent direct conduction of heat from the manifold 22 to the periphery of the valve. The periphery of the valve will be kept cool by the gas between the manifold 22 and said periphery with the result that expansion and contraction will be reduced to the minimum. However, any such expansion or contraction which may occur will be compensated for by the relatively movable sealing members indicated at 44, 34, and 10.

Aside from their function as a means for forming a tight seal about the rotary valve, the bands or sleeves 44 also serve to prevent oil from leaking into the cylinder parts from about the valve.

Figure 9:
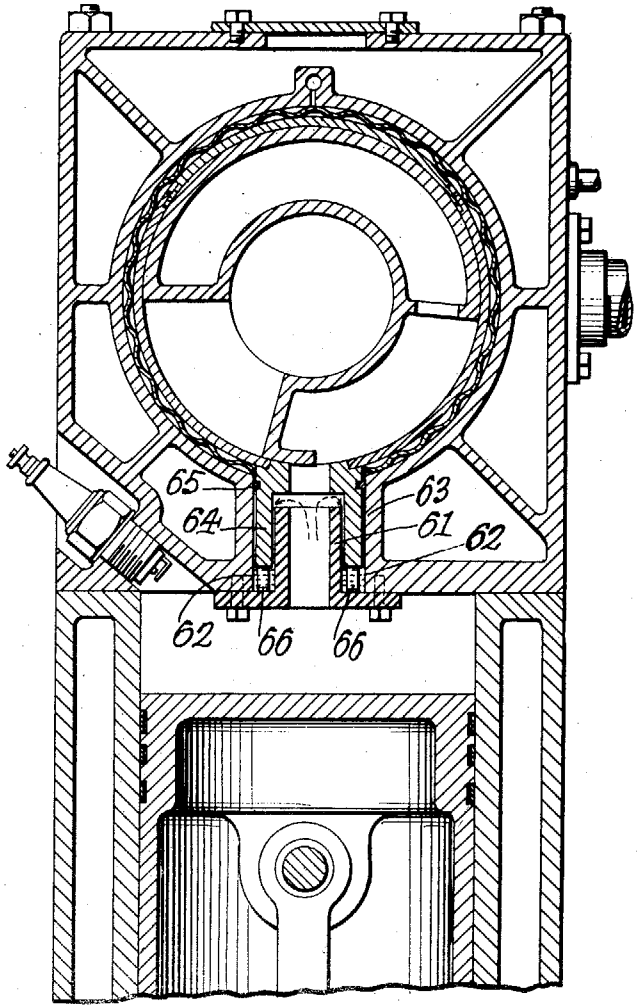
Fig. 9 is a view similar to Fig. 2 showing a slightly modified construction.

While it is preferred to depend on oil under pressure as a means for holding the takeup members pressed against the periphery of the valve, thereby to supplement the action of the springs, it is to be understood that, if preferred, a structure such as illustrated in Fig. 9 may be utilized. In this structure the ring 14 is dispensed with. Instead the guide member 61 which forms the oil pocket 62 within port 63 receives the takeup member 64 which has a seal ring 65 extending therearound in sliding contact with the wall of the port 53. During the operation of the engine pressure from the cylinder will be exerted over the end of the guide member 61 and back against the oil in the pocket 62 thereby forcing said oil to press against member 64 which, consequently, will be held with proper pressure against the periphery of the cylindrical valve.

Figure 12:
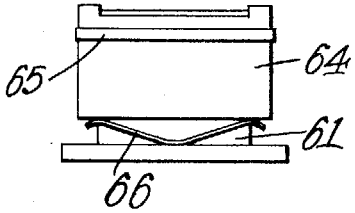
Fig. 12 is a side elevation of the takeup block and guide assembled.
Figure 10:
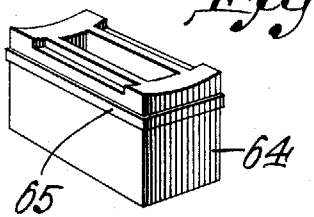
Fig. 10 is a perspective view of the modified form of sealing block or takeup shown in Fig. 9.
Figure 11:
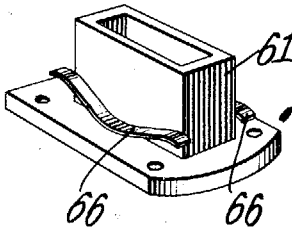
Fig. 11 is a perspective view of the port and guide therefor.

Under some conditions it might be possible to dispense with the pressure lubricating system altogether and to rely solely on the action of springs 66 against the takeup member 67 as shown in Fig. 12. It will be necessary, however, to have these springs submerged in oil as otherwise they would be soon rendered inefficient.

As will be seen from the foregoing a valve constructed in accordance with the principles of the present invention comprises a plurality of sleeves which surround the rotary valve one adjacent to each cylinder port, and which are held with a resilient pressure against the periphery of the valve in such a way that each sleeve is automatically responsive to the pressure or suction conditions existing at any particular instant at the port of the cylinder which it controls. Variations in such pressure and suction conditions between adjacent cylinders at any instant do not affect the efficiency of functioning of the valve because of the fact that each sealing sleeve is separate from the sleeve for the adjacent cylinder. The construction of the valve whereby the inlet and exhaust ports have an arc-shaped opening of approximately 90° extent insures that full valve opening can be maintained both for intake and exhaust for a greater extent of crankshaft movement than possible with the use of poppet valves. The construction of the sealing means at the cylinder ports results in the provision of restricted circuitous path between the bearing surfaces of the members which form such sealing means and due to this circuitous path together with the liquid seal formed by the oil in the sump intermediate the ends of such path escape of fuel or gas from one cylinder to an adjacent one is effectively prevented.

While I have shown a satisfactory constructional example embodying the principles of my invention, it will be undersood that the invention is not limited to the specific constructional details illustrated and described, but that many changes, variations and modifications may be resorted to without departing from such principles.

I claim:

1. In an internal combustion engine the combination with a cylinder block, a head thereon having an interior valve casing, there being a port extending from the interior of the cylinder block into the valve casing, of a rotary valve within the casing, a guide member with and spaced from the walls of the port, a takeup member slidable upon the guide member and within the port, there being a lubricant pocket around the guide member and back of the takeup member, and resilient means normally submerged in lubricant within the pocket for holding the takeup member pressed against the periphery of the valve, said takeup member having an opening for communication with the ports in the valve and with the port in the head.

2. In an internal combustion engine the combination with a head having a valve casing therein, and a port leading from said casing through one wall of the head for communication with a cylinder, of a valve mounted for rotation in the casing having fuel and exhaust ports for alternate communication with the port in the head, a guide member within the port in the head, a takeup block extending therearound and slidable within said port, means for exerting constant pressure against one end of the takeup block for holding the other end thereof constantly in sealing and working contact with the periphery of the valve, and a contractible sealing member interposed between the valve and its casing and abutting at its ends against the takeup block.

3. The combination with the head of an internal combustion engine having a valve casing therein and a port extending from said casing through one wall of the head for communication with a cylinder, of a rotary valve within the casing having separate fuel and exhaust ports for successive communication with the port in the head and casing, a guide member within and spaced from the walls of the port in the head, a takeup block extending therearound and slidable thereon, yielding means for holding said block in sealing and working contact with the periphery of the valve, said valve having an annular groove into which the takeup block projects, means for subjecting the takeup block to end pressure for holding the same in sealing contact with the grooved valve, a contractible and expansible sealing band within the groove abutting at its ends against and held against rotation by the takeup block, and resilient means for holding said band pressed against the valve.

4. The combination with the head of an internal combustion engine having a cylindrical valve casing therein provided with a port extending through the wall of the head for communication with a cylinder, of a takeup block slidably mounted in said port, a rotary valve in the casing having separate fuel and exhaust ports for successive communication with the ports in the block, means for maintaining a pressure against the takeup block for holding it in sealing and working contact with the periphery of the valve, a sectional sealing band extending around the valve and abutting at its ends against the takeup block, resilient spreading elements interposed between the ends of the sections of the band, a resilient means engaging the band and bearing against the valve casing for holding said band contracted upon the valve to maintain a sealed working fit between the band and the valve, and means for directing lubricant into the space between said band and the valve casing.

5. In an internal combustion engine a head having a cylindrical valve casing therein, there being a port extending from said casing through one wall of the head for communication with the interior of a cylinder, a valve mounted for rotation within the casing having non-communicating concentric intake and exhaust manifolds therein, there being a port within the valve communicating with the respective manifolds and movable into successive communication with the port in the head, there being an annular groove in the outer surface of the valve from which the ports extend, a resiliently held takeup block slidable in the port in the head and casing and having a sealing working fit against the periphery of the valve and within the groove, an extensible sealing band including lapping sections extending around the valve within the groove and abutting at its ends against the takeup block, and means between the valve casing and the band for holding said band contracted about the valve to maintain a sealing fit between said valve and the band.

6. In an internal combustion engine a head having a valve casing therein, there being a port extending from said casing through one wall of the head for communication with a cylinder and another port extending from said casing through one wall of the head for communication with a fuel supply, a rotary valve within the casing having annular grooves, takeup blocks within the ports, means for subjecting said blocks to pressure for maintaining a sealing working connection between the blocks and the grooved portions of the valve, there being concentric intake and exhaust manifolds within the valve, there being a port in the intake manifold portion of the valve for communication with the intake port and separate ports in the intake and exhaust manifold portions of the valve for successive communication with the port leading to the cylinder, and extensible, contractible, sealing bands within the respective grooves providing sealing working connections between the valve and its casing, the ends of the bands abutting against and being held against rotation by the takeup blocks.

7. In an internal combustion engine the combination with a head having a valve casing therein and a port leading from said casing through one wall of the head for communication with a cylinder, of a valve mounted for rotation in the casing having fuel and exhaust ports for alternate communication with the port in the head, a guide member detachably secured to one face of the head whereby, when the head is removed from its cylinder, said end of the member and its fastening means are exposed, said guide member being extended into the port in the head, a takeup block extending around the guide member and slidable within the port, and means for exerting constant pressure against one end of the takeup block for holding the other end thereof constantly in sealing and working contact with the periphery of the valve, said takeup block being removable with the guide member from the port.

8. In an internal combustion engine the combination with a head having a valve casing therein and a port leading from said casing through one wall of the head for communicating with a cylinder, of a valve mounted for rotation in the casing having fuel and exhaust ports for alternate communication with the port in the head, a guide member detachably secured to one face of the head whereby, when the head is removed from its cylinder, said end of the member and its fastening means are exposed, said guide member being extended into the port in the head, a takeup block extending around the guide member and slidable within the port, and means for directing a lubricant under pressure against one end of the takeup block thereby to hold the other end thereof constantly in sealing and working contact with the periphery of the valve.

9. In an internal combustion engine the combination with a head having a valve casing therein, and a port leading from said casing through one wall of the head for communication with a cylinder, of a valve mounted for rotation in the casing having fuel and exhaust ports for alternate communication with the port in the head, a guide member within the port in the head, a takeup block extending therearound and slidable within said port, means for exerting constant pressure against one end of the takeup block for holding the other end thereof constantly in sealing and working contact with the periphery of the valve, and a contractible sealing member interposed between the valve and its casing, said takeup block constituting means for holding the sealing member against rotation with the valve.

10. The combination with the head of an internal combustion engine having a valve casing therein and a port extending from said casing through one wall of the head for communication with a cylinder, of a rotary valve within the casing having separate fuel and exhaust ports for successive communication with the port in the head and casing, a guide member within and spaced from the walls of the port in the head, a takeup block extending therearound and slidable thereon, yielding means for holding said block in sealing and working contact with the periphery of the valve, means for subjecting the takeup block to end pressure for holding the same in sealing contact with the valve, a contractible and expansible sealing band held against rotation by the takeup block, and resilient means for holding said band pressed against the valve.

11. The combination with the head of an internal combustion engine having a cylindrical valve casing therein provided with a port extending through the wall of the head for communication with a cylinder, of a takeup block slidably mounted in said port, a rotary valve in the casing having separate fuel and exhaust ports for successive communication with the ports in the block, means for maintaining a pressure against the takeup block for holding it in sealing and working contact with the periphery of the valve, a sealing band extending around the valve held against rotation by the takeup block, resilient spreading elements interposed between the ends of the sections of the band, a resilient means engaging the band and bearing against the valve casing for holding said band contracted upon the valve to maintain a sealed working fit between the band and the valve, and means for directing lubricant into the space between said band and the valve casing.

12. In an internal combustion engine a head having a valve casing therein, there being a port extending from said casing through one wall of the head for communication with a cylinder, and another port extending from said casing through one wall of the head for communication with a fuel supply, a rotary valve within the casing, takeup blocks within the ports, means for subjecting said blocks to pressure for maintaining a sealing working connection between the blocks and the valve, there being concentric intake and exhaust manifolds within the valve, there being a port in the intake manifold portion of the valve for communication with the intake port and separate ports in the intake and exhaust manifold portions of the valve for successive communication with the port leading to the cylinder, and extensible, contractible, sealing bands providing sealing working connections between the valve and its casing, the bands being held against rotation by the takeup blocks.

13. The combination with a working piston and a cylinder having a port through which gas under pressure passes, of a valve casing, a rotary valve mounted within said casing for controlling the admission and exit of gas through said port, means for rotating said valve in synchronism with the cycle of operation of said piston and cylinder, and means for compensating for expansion and contraction of the valve comprising a split sleeve having its entire periphery expansible interposed between said valve and said casing and the free ends of said sleeve engaging and maintaining sealing contact with said valve and casing adjacent to said port.

14. The combination with a working cylinder and piston of a valve casing mounted adjacent to said cylinder, a port for establishing communication between said casing and cylinder, a rotary valve in said valve casing operating in synchronism with the cycle of operation of said cylinder and piston and controlling the ingress and egress of gas through said port and resilient sealing means flexibly surrounding said valve and interposed freely between it and said casing, to engage said casing with a resilient sealing pressure immediately adjacent to said port.

15. The combination with a working cylinder and piston of a valve casing mounted adjacent to said cylinder, a port for establishing communication between said casing and cylinder, a rotary valve in said valve casing operating in synchronism with the cycle of operation of said cylinder and piston and controlling the ingress and egress of gas through said port, expansible and contractible sealing means flexibly surrounding said valve and interposed between it and said casing, and resilient means between said valve and casing exerting a substantially equally distributed pressure about the entire periphery of said sealing means to hold said sealing means in sealing contact with said valve.

16. The combination with a working piston and a cylinder having a port for the ingress and egress of gas, an expansible and contractible sleeve surrounding said valve adjacent to said port and resilient means in engagement with said sleeve and normally tending to contract the same and holding it with a substantially uniform resilient pressure throughout its entire length against the periphery of said valve.

17. The combination with a working piston and a cylinder having a port for the ingress and egress of gas, of a valve casing, a valve mounted for rotation within said casing, a sealing means located at the mouth of said port and comprising an inner member arranged in spaced relationship with said casing and defining therewith an annular recess, and a sealing member in contacting engagement with the periphery of said valve and having an annular sleeve projecting into said recess in sliding sealing contact with the walls of said recess but spaced from the bottom thereof, said recess forming an oil receiving chamber or sump which forms a liquid seal intermediate the ends of the sealing contact surface of said sleeve.

18. The combination with a working piston and a cylinder having a port for the ingress and egress of gas, of a valve casing, a valve mounted for rotation within said casing, a sealing means located at the mouth of said port and comprising an inner member arranged in spaced relationship with said casing and defining therewith an annular recess, and a sealing member in contacting engagement with the periphery of said valve and having an annular sleeve projecting into said recess in sliding sealing contact with the walls of said recess but spaced from the bottom thereof, said recess forming an oil receiving chamber or sump which forms a liquid seal intermediate the ends of the sealing contact surface of said sleeve and packing rings surrounding said sleeve.

19. The combination with a plurality of juxtaposed working pistons and cylinders, each of said cylinders having a port for the ingress and egress of gas, the ports of said cylinders being in spaced relationship, of a rotary valve having inlet and exhaust conduits, sealing means for said ports comprising a plurality of sleeves equally expansible and contractible throughout their entire periphery one for each of said ports surrounding said valve and arranged in spaced relationship thereon and in alignment with said ports, and resilient means for each of said sleeves for normally holding the same with a yielding substantially equal pressure against the entire periphery of said valve.

20. The combination with a working piston and a cylinder, said cylinder having a port for the ingress and egress of gas, of a valve casing, a rotary valve mounted within said casing, sealing means located in the mouth of said port and comprising means associated with said casing to form an annular recess, a sleeve projecting into said recess and in sealing contacting engagement with the side walls thereof, an expansible and contractible sleeve associated with said first mentioned sleeve and surrounding said rotary valve and resilient means for holding said expansible and contractible sleeve with a yielding pressure against the periphery of said valve.

21. The combination with a cylinder and piston, of a combined cylinder head and valve casing having a conduit communicating with said cylinder for the inlet and exhaust of gases to and from said cylinder, a rotary valve mounted in said casing, a sealing member having a port slidably mounted in said conduit and means for urging said member with a resilient pressure against said valve, a resilient split sleeve surrounding said valve and having its ends abutting against said member and cooperating with it to provide a fluid tight seal of said valve and casing adjacent to said port.

22. The combination with a cylinder and piston, of a combined cylinder head and valve casing having a conduit communicating with said cylinder for the inlet and exhaust of gases to and from said cylinder, a rotary valve mounted in said casing, a sealing member having a port slidably mounted in said conduit and means for urging said member with a resilient pressure against said valve, a resilient split sleeve surrounding said valve and having its ends abutting against said member and cooperating with it to provide a fluid tight seal of said valve and casing adjacent to said port, and resilient means in engagement with said sleeve for holding its ends against said member and its inner periphery with a substantially uniformly distributed pressure against said valve.

FREDERICK J. HOLMES.